Patented Aug. 22, 1933

1,923,795

UNITED STATES PATENT OFFICE 1,923,795

DRIVE MECHANISM FOR MOTOR VEHICLES

Stanley C. North, Syracuse, N. Y., assignor of one-fourth to Stanley H. Keeling and one-fourth to Dwight H. Keeling, Syracuse, N. Y.

Application September 24, 1931
Serial No. 564,865

1 Claim. (Cl. 74—7)

This invention has for its object, a drive mechanism for motor vehicles whereby either of the drive wheels can over-run, as when the vehicle is turning a corner, and over-run forwardly when the vehicle is traveling forwardly, and also rearwardly if the vehicle is backing up and turning a corner, which mechanism is particularly simple, compact and economical in construction, and highly efficient in use.

The invention consists in the novel features and in the combinations and constructions hereinafter set forth and claimed.

In describing this invention, reference is made to the accompanying drawings, in which like characters designate corresponding parts in all the views.

Figure 1:
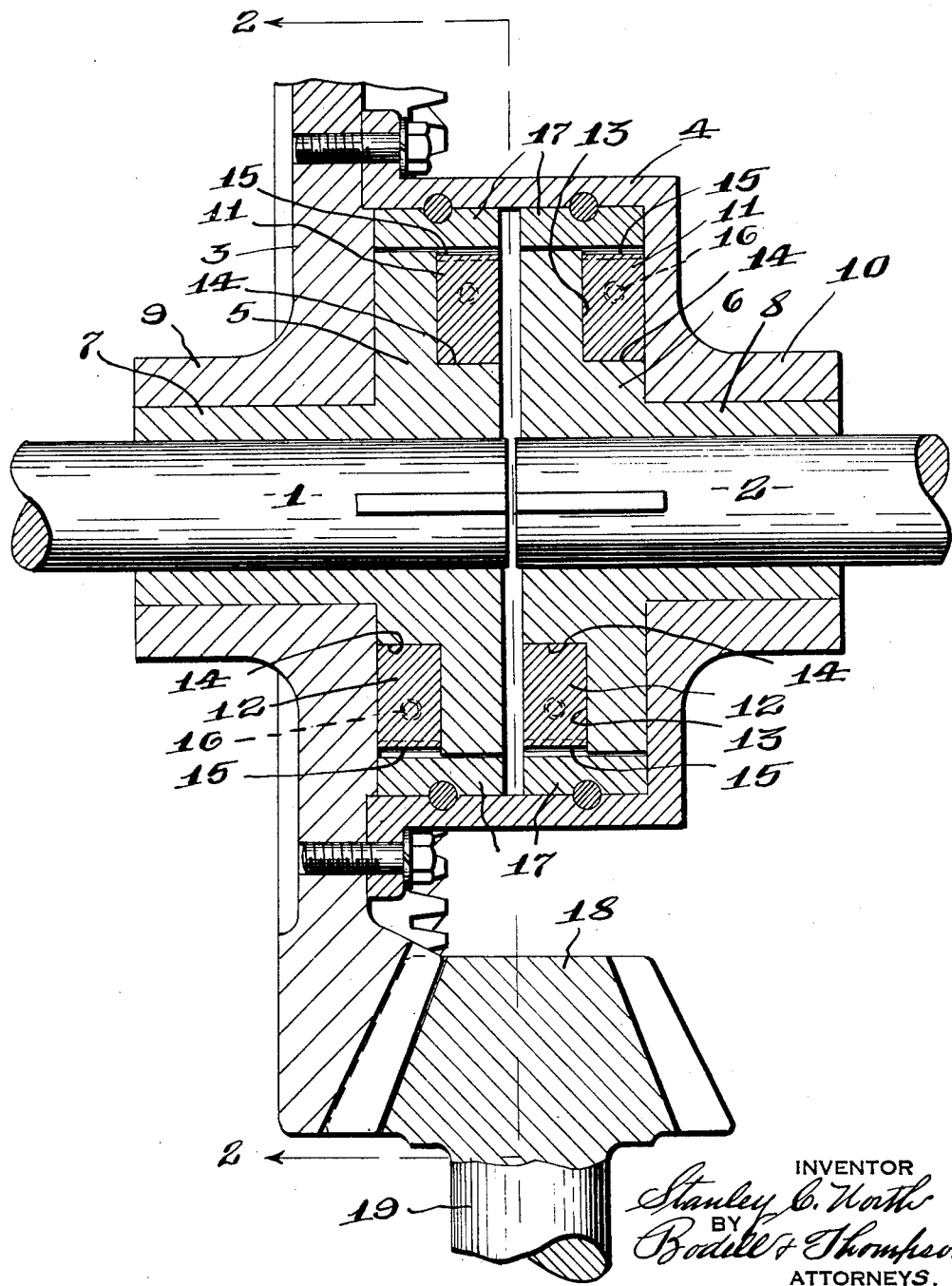
Figure 1 is a fragmentary cross sectional view through the portion of the driving mechanism embodying my invention, the contiguous portions of the driving axles being shown, Figure 1 being taken on the plane of line 1—1, Figure 2.

This drive mechanism comprises generally, a pair of driven members, a driving member common to both of them, and an over-running clutch between the driving member and each of the driven members, whereby each driven member is free to over-run relatively to the driving member and to each other, and preferably includes oppositely acting over-running clutches between the driving member and each driven member, so that each driven member can over-run when necessary, as when the vehicle is turning a corner regardless of whether the vehicle is traveling forwardly or rearwardly.

I have here shown my invention as embodied in a mechanism whereby the driven members are axles arranged end to end and the over-running clutches arranged between the driving member and the inner ends of the axles in the same location that the differential gearing is usually located.

1 and 2 designate the driven members or axles to which the ground wheels are connected, or from which the ground wheels are driven.

3 is the driving member, this being here shown as the usual ring gear having a housing 4 enclosing the inner ends of the shafts 1, 2, the ring gear and its housing being mounted to rotate about the axes of the axles 1, 2.

5 and 6 are clutch members having hubs 7 and 8 respectively mounted on the axles 1, 2, these members 5, 6, being discoidal and located within the housing 4. The ring gear 3 and its housing is provided with hubs 9 and 10 mounted on the hubs 7 and 8. The clutch members 5, 6 are keyed to the axles in any suitable manner.

11 and 12 are sets of clutch elements carried by each member 5, 6, these sets 11 and 12 being oppositely disposed, one set 11 serving to transmit the forward rotation of the ring gear to the clutch member 5 or 6, and the other set 12 to transmit rearward rotation of the driving member to the clutch member 5 or 6. Also, the sets of clutch elements 11 permit forward over-running of the clutch members 5, 6 and the shafts 1, 2 and the clutch elements 12 permit rearward over-running. The elements 11 and 12 are alike in construction, except that they are arranged reversely relatively to each other.

Each element 11 and 12 is here shown as in the form of a dog, or a pawl, pivotally mounted in a recess 13 in the member 5 or 6, which recess opens through the periphery of the member 5 or 6, the pawl having its inner end cylindrical or arc-shaped, and seating in a cylindrical or arc-shaped bearing 14 at the inner end of each recess. The outer end of each pawl 11 is formed with an arc-shaped clutch face 15 struck from a different center than the cylindrical or arc-shaped surface at the inner end of the pawl, and with a larger radius so that the clutch face is virtually a cam or wedge to bind the driving and driven members together during rotation of the driving member in one direction. The clutch face 15 of each pawl 11 is oppositely arranged relatively to the clutch face 15 of each pawl 12. The recess is so shaped as to limit the rocking movement of the pawl, and a spring 16 is provided tending to thrust each pawl in such direction that it is out of operative position. The pawls coact with a bearing ring 17 provided in the housing 4 and suitably keyed thereto against rotation, there preferably being one ring of each member 5, 6. The driving member or ring gear coacts with a pinion 18 on the propeller shaft 19, which propeller shaft is connected to the engine of the vehicle, usually through the transmission gearing.

Figure 2:
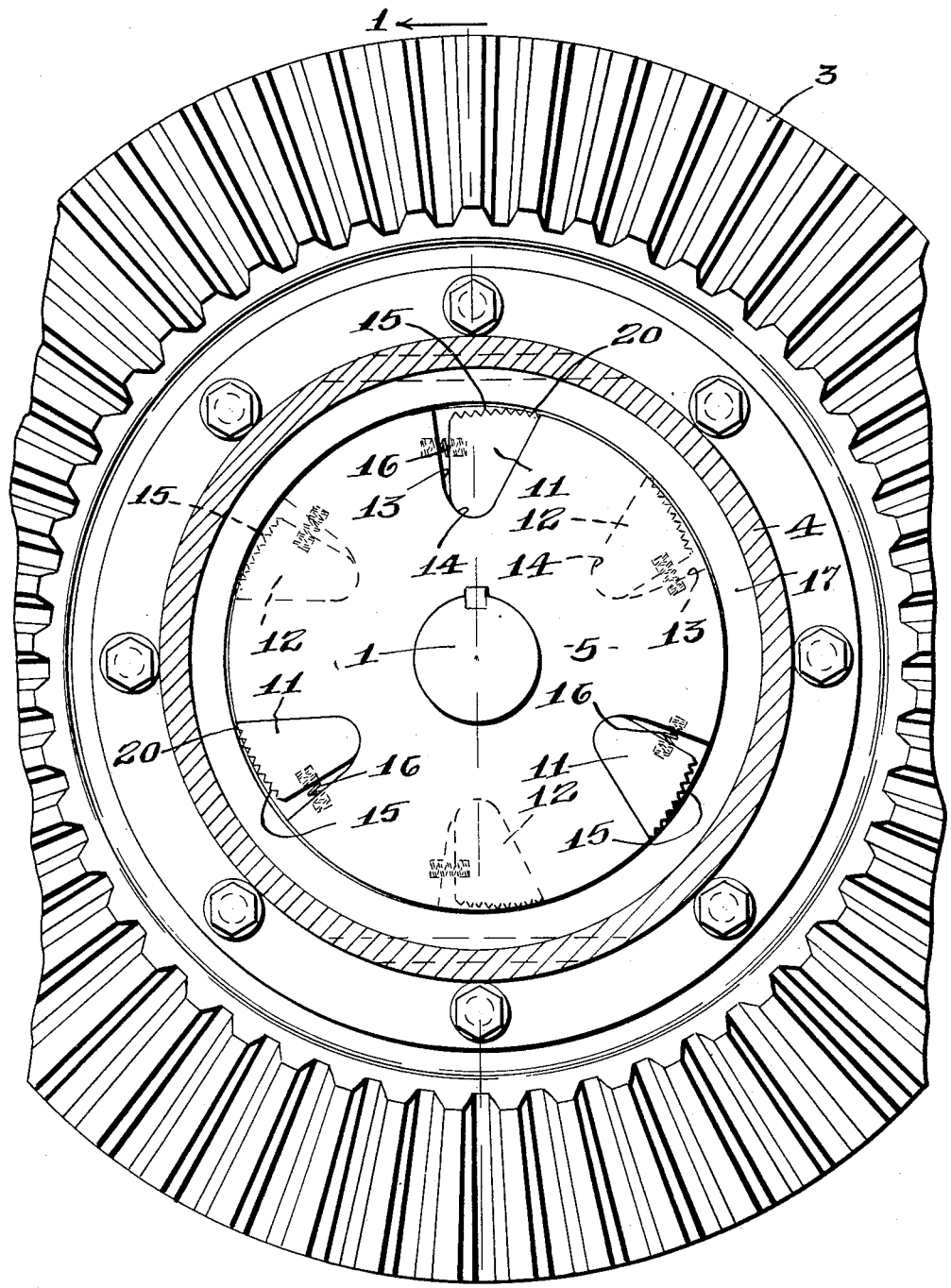
Figure 2 is a sectional view on line 2—2, Figure 1.

In operation, during forward movement of the driving member 3, that is, movement over to the left in Figure 2, the rings 17 being engaged at 20 with the sets of pawls 11, tend to rock the pawls 11 to the left, and because of the eccentricity of the faces 15 with respect to the rocking axes of the pawls, the pawls are carried to the left into firm binding engagement with the rings 17, so that the drive of the member 3 is transmitted through the pawls 11, to the clutch members 5, 6, and to the axles 1, 2. If however, either or both of the ground wheels under the momentum of the traveling vehicle are rotating faster than the driving members 3, then the clutch members 5, 6, and the axles 1, 2, are free to over-run in a forward direction, as then the rotation of the members 5, 6, or either of them, faster than the housing 4 will tend to shift the pawl out of its binding position. That is, into the position shown in Figure 2. The same action takes place with respect to the pawls 12 when the vehicle is backing up, the action of the pawls in all cases being entirely automatic.

By this mechanism, the usual differential gearing is dispensed with, as the outside driving wheel can over-run when the vehicle is turning a corner either forwardly or rearwardly.

What I claim is:

A drive mechanism including driving and driven members and an over-running clutch between them, one of said members having an internal annular face, and the other member being mounted with its periphery opposed to said face, and formed with recesses, a pawl pivotally mounted in the recess to swing in the direction of rotation, and opposite to the direction of rotation, the pawl extending outwardly from its pivot relatively to the axis of the inner member, and having an arc-shaped clutch face at its outer end struck from a different center from the axis of the pawl, and with one end normally tangent to the inner annular face and receding from the point of tangency in the direction of rotation, said arcuate face being toothed to coact with said annular face, and spring means for resisting movement of the pawl in the direction of rotation.

STANLEY C. NORTH.